United States Patent [19]
Zeltmann

[11] 3,894,345
[45] July 15, 1975

[54] DRYING DEVICE

[76] Inventor: Walter Zeltmann, 719 Bay Ridge Ave., Brooklyn, N.Y. 11220

[22] Filed: Sept. 16, 1974

[21] Appl. No.: 506,429

[52] U.S. Cl. ..................... 34/93; 126/270; 237/1 A
[51] Int. Cl.² ......................................... F26B 19/00
[58] Field of Search .......... 34/80, 93, 219; 126/270, 126/271; 237/1 A

[56] References Cited
UNITED STATES PATENTS
1,678,711  7/1928  Shipman .................................. 34/93
2,462,952  3/1949  Dunkak .............................. 126/270
2,529,621  11/1950  Mayo ...................................... 34/93
2,559,870  7/1951  Gay ..................................... 237/1 A Primary Examiner—Kenneth W. Sprague
Assistant Examiner—James C. Yeung
Attorney, Agent, or Firm—Charles Marks

[57] ABSTRACT

A stack adapted to absorb and retain solar heat surmounts a chamber accommodating moisture-containing material to be dried by ambient air. The absorbed solar heat expands air within the stack, thereby exhausting the air therein and inducing the aforesaid ambient air to flow through the stack.

6 Claims, 4 Drawing Figures 3,894,345

3,894,345

DRYING DEVICE

BACKGROUND OF THE INVENTION

1. Field of the Invention

This invention relates generally to means for accelerating a draft of air or other gas so as to dry materials exposed thereto. In particular, the invention relates to a device for utilizing solar energy to accelerate a column of air so as to increase its ability to dry moisture-containing materials exposed to said column of air.

2. Description of the Prior Art

Heretofore, it has been customary to expose various materials such as soybeans, corn, other grains, prunes, raisins, fibres, textiles, lumber, ceramic articles and a great variety of other moisture-laden articles to drying processes wherein the moisture is absorbed by the surrounding air and removed by the natural movement of such air or by a mechanically induced draft thereof.

It has also been customary to burn various fuels so as to generate heated air and gases to which the materials to be dried are exposed, thereby removing the absorbed moisture. Such drying processes are expensive by reason of the cost of the fuel employed and the need for auxiliary equipment such as a suitable furnace.

When processes of the foregoing kind use the natural flow of air to accomplish drying, they are correspondingly slow and inefficient; and when they employ mechanical aids to increase the rate at which such drying is accomplished, they are often unduly expensive and complex.

The present invention solves these problems. Thus, it is an object of the present invention to provide an improved means for drying a variety of materials, which said means is simple and inexpensive.

Another object of the present invention is to provide means of the foregoing kind which utilizes solar energy to activate and accelerate said drying process.

Another object of the invention is to provide an improved means for absorbing and retaining such solar energy so as to make it available for accomplishing the drying of various materials.

Another object of the invention is to provide drying means of the foregoing character which is adapted for efficient operation in a particular geographical area.

Other and further objects of the invention will become apparent from the following description when read in conjunction with the accompanying drawings.

SUMMARY OF THE INVENTION

The present invention employs a draft-accelerating stack in conjuction with a chamber which accommodates articles or materials intended to be dried. The stack has a double wall interrupted by an air space. The outer wall is exposed to sunlight and is composed of glass or other material capable of transmitting ultra violet or other short wave radiation but is opaque to long wave radiation. The external surface of the inner wall is blackened to facilitate the absorption of heat and its inner surface is silvered, aluminized or otherwise polished so as to radiate and reflect the heat thus absorbed to the interior of the stack.

In this way, the interior region of the stack is raised to a high temperature, thereby expanding the column of air therein so as to cause its exhaust from the stack with corresponding rapidity.

This effect is augmented by the air in the space between the walls of the stack which is also heated by said radiation so as to expand and flow into a chamber surmounted by the stack, thereby creating a partial vacuum in said space, which said vacuum acts as an insulator surrounding the inner wall of the stack.

Articles or materials intended to be dried are exposed to the flow of heated air accomplished by the foregoing arrangement and are removed thereafter when desired.

DESCRIPTION OF THE PREFERRED EMBODIMENT

Figures 1, 2:
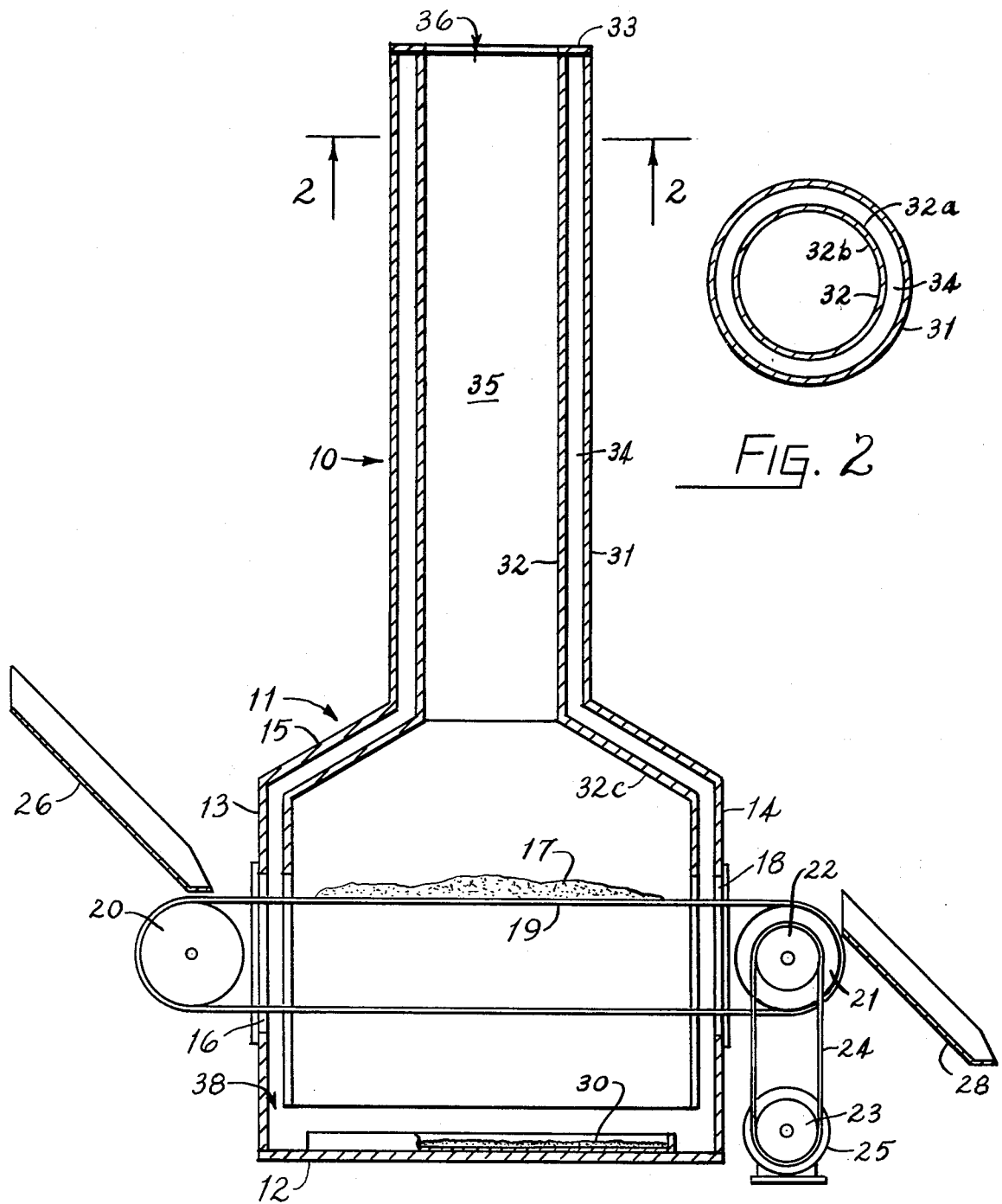
FIG. 1 is a cross-sectional, diagrammatic view of one embodiment of the invention.
FIG. 2 is a cross-sectional view taken about the line 2—2 of FIG. 1.

One embodiment of the invention, which may be employed to dry grain, corn, soybeans and other particulate matter, is depicted in FIG. 1 of the accompanying drawing. As may be seen in the said FIG. 1, this embodiment of the invention comprises a hollow, cylindrical stack, generally designated by the numeral 10, surmounting a chamber, generally designated by the numeral 11, having a horizontal base 12, vertical side walls 13, 14 and a tapered member 15 communicating between the vertical side walls 13, 14 and the stack 10.

The chamber 11 is provided with apertures, 16, 18 formed in the side walls 13, 14 and accommodating a conveyor belt 19 preferably composed of a porous material and actuated continuously or intermittently in the conventional manner by rollers 20, 21, pulley 22 operatively connected to roller 21, pulley 23 provided with a belt 24 connected with pulley 22, said pulley 23 also being operatively connected with motor 25.

Means for introducing particulate matter 17 upon the conveyor belt 19, such as a chute 26, is provided in the vicinity of one end of the conveyor belt 19 and means for receiving such particulate matter after it has been dried, such as the second chute 28, is provided in the vicinity of the other end of the conveyor belt 19.

A pan 29 is disposed upon the base 12 of the chamber 11, said pan 29 being adapted to receive a dessicant 30 whereby moisture in the air within the chamber 11 may be removed.

An important feature of the invention resides in the construction of the stack 10, which includes an outer wall 31 and an inner wall 32 sealed at their upper ends by a closure 33. The outer wall 31 is preferably composed of glass or other material capable of transmitting ultra violet or other short wave radiation but is opaque to long wave radiation. The external surface 32a of the inner wall 32 is black so as to absorb radiant heat transmitted thereto and the internal surface 32b of the inner wall is silvered, aluminized or otherwise polished so as to radiate and reflect inwardly radiant heat transmitted thereto from the external surface 32a (see FIG. 2.) Between the outer wall 31 and the inner wall 32 is an air space 34.

With this arrangement, it will be seen that ultra violet or other short wave radiation forming part of sunlight can be transmitted through the outer wall 31 so as to impinge upon the black surface 32a of the inner wall 32. The heat produced by such radiation will be adsorbed through the black surface 32a and transmitted to the inner surface 32b of the inner wall 32 whence said heat will be radiated and reflected to the interior region 35 of the stack 10.

Air within said region 35 will thereby be heated so as to expand and escape from the mouth 36 of the stack 10, thus creating a draft of warm air from the apertures 16, 18, which communicate with the surrounding atmosphere, through the stack 10, the particulate matter 17 being exposed to said draft so as to permit any moisture in said particulate matter 17 to be absorbed by the air in said draft. The particulate matter 17 may be exposed to said draft for as long as desired and then removed therefrom by the conveyor belt 19 upon actuation by the motor 25. As previously noted, the conveyor belt 19 is composed of a porous material, thereby facilitating the flow of air upon and through the particulate matter 17.

It will also be seen that air within the air space 34 will be heated by the solar radiation transmitted through the outer wall 31, said air being thereby induced to expand so as to escape through the lower exit 38 of said air space 34 and thence into the chamber 11 and stack 10. In this way, the aforesaid air draft from the chamber 11 through the stack 10 is accelerated. At the same time, since the air within the air space 34 is expanded so as to escape therefrom, a partial vacuum is created in said air space 34, thereby causing said air space 34 to act as an insulator against the escape of heat from the interior of the stack 10 and radially outwardly of the inner wall 32.

It will also be seen that moisture-containing articles or materials other than particulate matter may be readily disposed on the conveyor belt 17 or otherwise within the chamber 11 so as to effect drying thereof.

The form of the invention depicted in FIGS. 1 and 2 may be employed in torrid zones of the earth where the inclination of the tapered member 15 may be such as to be perpendicular to the average direction of the sun's rays in such zones throughout the year and where the inclined portion 32c of the inner wall 32 will reflect heat absorbed thereby upon the area of the conveyor belt 19 intended for occupancy by the particulate matter 17 during the drying thereof — said inclined portion 32c being parallel to the tapered member 15.

Figure 3:
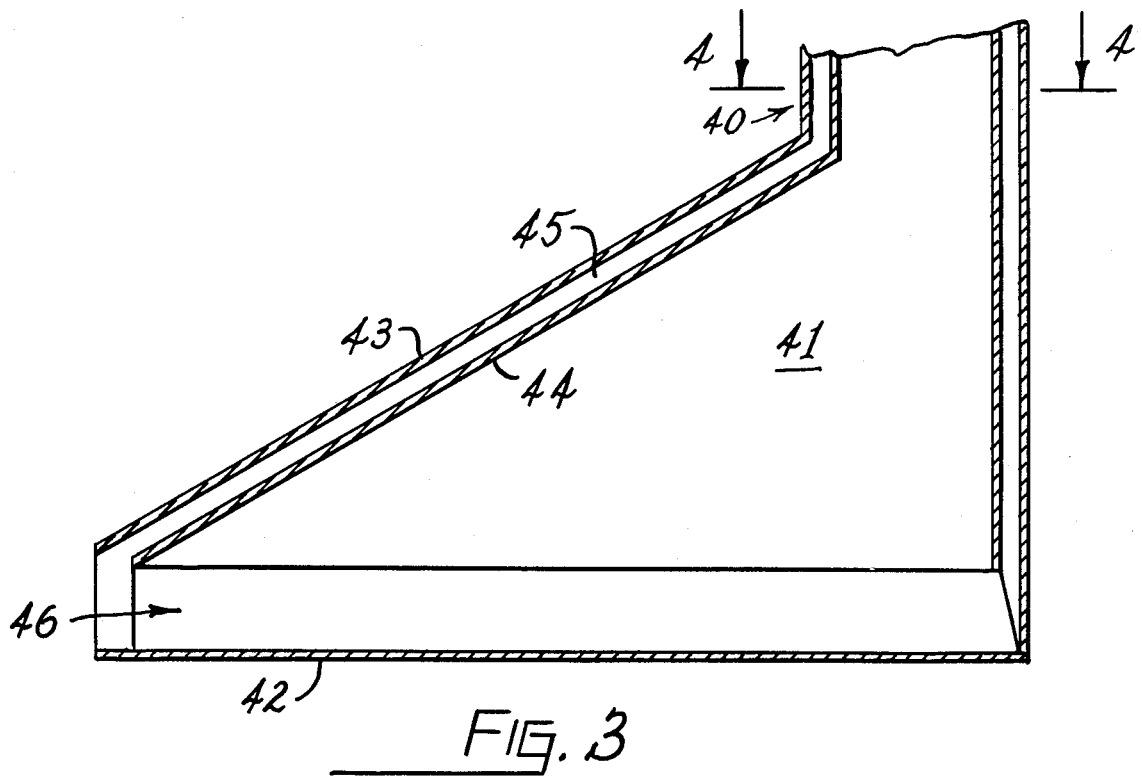
FIG. 3 is a cross-sectional, diagrammatic view of a modified form of the invention.
Figure 4:
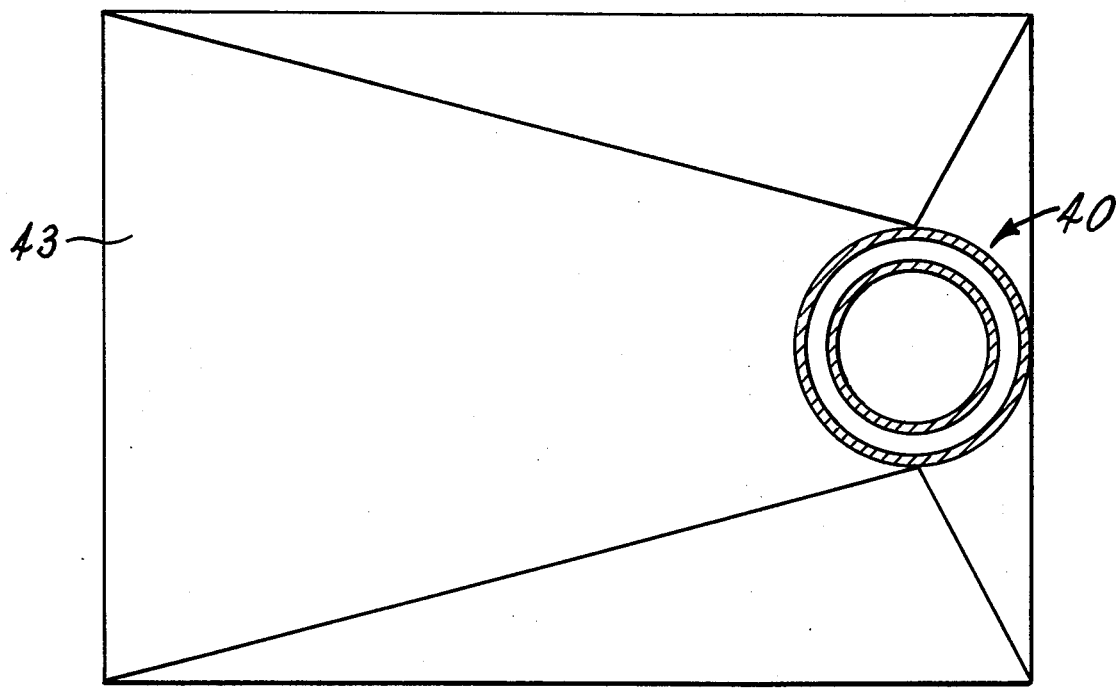
FIG. 4 is a cross-sectional view taken about the line 4—4 of FIG. 3.

In a modified form of the invention, depicted in FIGS. 3 and 4 of the drawings, the stack 40 surmounts a chamber 41 having a horizontal base 42 and an inclined roof 43. This form of the invention may be employed in temperate and polar zones of the earth, the said roof 43 being inclined in a direction which is perpendicular to the average direction of the sun's rays in said zones throughout the year. This form of the invention also has an inner wall 44 disposed parallel to said roof 43 and an air space 45 therebetween — said roof 43, inner wall 44 and air space 45 functioning in a manner analogous to the manner of operation of the outer wall 31, inner wall 32 and air space 34 of the first described form of the invention.

Matter to be dried (not shown) may be disposed in any convenient manner upon the horizontal base 42 where it is exposed to a draft of air flowing into aperture 46 from the surrounding atmosphere and through the stack 40 at the upper end thereof — said draft being actuated in the manner previously described in respect to the first described form of the invention.

When dry, the particulate matter or other material or articles within the said forms of the invention may be removed and the foregoing process may be repeated with respect to other materials or articles intended for drying.

I claim:

1. In a drying device surrounded by an atmosphere containing air through which solar radiation is transmitted, the combination comprising:
   a. a hollow stack having an interior region and a mouth communicating between said interior region and said surrounding atmosphere;
   b. a chamber surmounted by and communicating with the interior region of said hollow stack, and accommodating matter containing evaporable moisture;
   c. said chamber being provided with at least one aperture communicating with the atmosphere surrounding said drying device;
   d. said hollow stack being provided with means for absorbing and retaining solar radiation including:
      i. an outer wall composed of glass accommodating the transmission of short wave radiation but opposing the transmission of long wave radiation;
      ii. an inner wall provided with a blackened surface confronting said outer wall and a silvered surface confronting the interior region of said hollow stack, said inner wall accommodating the transmission of heat therethrough and reflecting such heat to the interior region of said hollow stack;
      iii. an air space between said outer wall and said inner wall;
      iv. said air space communicating with said chamber;
      v. air within said air space being heated by said short wave radiation, whereby said air is communicated to said chamber, thereby forming a partial vacuum in said air space;
      vi. closure means connecting the upper ends of said outer and inner walls;
   e. a column of air disposed within the interior region of said hollow stack and exhaustible through the mouth of said stack when the interior region of said hollow stack is heated;
   f. the exhaust of said column of air from the mouth of said hollow stack thereby creating a draft of air from said aperture with which said chamber is provided through said chamber and said hollow stack;
   g. said matter containing evaporable moisture being exposed to said draft of air;
   h. said evaporable moisture being absorbable in said draft of air.

2. In a device according to claim 1:
   a. said outer wall including a tapered portion communicating with said chamber;
   b. said inner wall including an inclined portion disposed parallel to said tapered portion of said outer wall;
   c. said tapered portion of said outer wall being connected to vertical side walls of said chamber surmounting a horizontal base thereof;

d. said air space extending between said tapered portion of said outer wall and said inclined portion of said inner wall;

e. said air space communicating with the interior of said chamber.

3. In a device according to claim 1, means for introducing said matter containing evaporable moisture into said chamber and for removing said matter containing evaporable moisture therefrom.

4. In a device according to claim 3, said means for introducing said matter containing evaporable moisture into said chamber and for removing said matter containing evaporable moisture therefrom including:

a. a first inclined chute accommodating said matter containing evaporable moisture;

b. conveyor means adjacent to said inclined chute, whereby said matter containing evaporable moisture may be disposed upon said conveyor means and removed into said chamber;

c. said conveyor means extending through said aperture into said chamber;

d. a second inclined chute disposed adjacent to said conveyor means and accommodating said matter containing evaporable moisture after it has been disposed in said chamber, thereby permitting removal of said matter containing evaporable moisture from said chamber after exposure to said draft of air.

5. In a device according to claim 2, the inclination of said tapered portion of said chamber being perpendicular to the average annual direction of the sun's rays upon that part of the earth where said device is located.

6. In a device according to claim 2, the inclined portion of said inner wall reflecting heat upon the area intended for occupancy by said matter containing evaporable moisture within said chamber.

* * * * *